(12) United States Patent
Hopkins

(10) Patent No.: US 10,739,236 B1
(45) Date of Patent: Aug. 11, 2020

(54) APPARATUS AND METHOD FOR VORTEX MIXING AND CELL DISRUPTION OF A LABORATORY SAMPLE

(71) Applicant: BioSpec Products, Inc., Bartlesville, OK (US)

(72) Inventor: Thomas R. Hopkins, Bartlesville, OK (US)

(73) Assignee: BioSpec Products, Inc., Bartlesville, OK (US)

( * ) Notice: Subject to any disclaimer, the term of this patent is extended or adjusted under 35 U.S.C. 154(b) by 645 days.

(21) Appl. No.: 15/205,748

(22) Filed: Jul. 8, 2016

Related U.S. Application Data

(60) Provisional application No. 62/190,003, filed on Jul. 8, 2015.

(51) Int. Cl.
*G01N 1/00* (2006.01)
*G01N 1/28* (2006.01)
(Continued)

(52) U.S. Cl.
CPC .......... *G01N 1/286* (2013.01); *B01F 11/0005* (2013.01); *B01F 11/0008* (2013.01); *B01F 15/00409* (2013.01); *G01N 1/38* (2013.01); *B01F 2215/0037* (2013.01); *B01F 2215/0073* (2013.01)

(58) Field of Classification Search
CPC ....................................................... G01N 1/00
See application file for complete search history.

(56) References Cited

U.S. PATENT DOCUMENTS 3,237,455 A 3/1966 Slater
3,361,343 A * 1/1968 Lerner .................. B04B 5/0421
494/16
(Continued)

FOREIGN PATENT DOCUMENTS

CN 201632233 U 11/2010
CN 204008359 U 12/2014
(Continued)

OTHER PUBLICATIONS

Ironton Multipurpose Oscillating Tool; Northern Tool + Equipment; http://www.northerntool.com/shop/tools/product_200641726_ 200641726; printed Jul. 7, 2016.
(Continued)

*Primary Examiner* — Jyoti Nagpaul
(74) *Attorney, Agent, or Firm* — Chad Hinrichs PLLC

(57) ABSTRACT

An apparatus having a plate mountable on an oscillating multi-function tool and having a plurality of sample apertures sized to receive sample vials. The sample apertures may be lined with resilient grommets or have a chamfered edge. The apparatus may further have a weighted base and housing with vibrating isolation means for holding the tool during operation. The apparatus may further have a timer to allow for timed operation. The method including providing a plate mounted on the arbor of an oscillating multi-function tool, inserting a sample vial in a sample aperture and turning on the tool. The method may further include operating the tool for a fixed time and providing a housing and base to hold the tool during operation.

18 Claims, 3 Drawing Sheets

(51) Int. Cl.
  *B01F 11/00* (2006.01)
  *B01F 15/00* (2006.01)
  *G01N 1/38* (2006.01)

(56) References Cited

U.S. PATENT DOCUMENTS

| | | | |
|---|---|---|---|
| 3,709,429 A * | 1/1973 | McKenzie | B04B 5/0414 |
| | | | 494/16 |
| 3,823,602 A | 7/1974 | Anderson | |
| 4,057,148 A * | 11/1977 | Meyer | B01L 9/06 |
| | | | 211/74 |
| 4,459,785 A | 7/1984 | Zimmer | |
| 4,534,536 A | 8/1985 | Nelson et al. | |
| 4,623,500 A | 11/1986 | Nelson et al. | |
| 4,747,693 A * | 5/1988 | Kahl | B01F 11/0008 |
| | | | 211/74 |
| 5,399,013 A * | 3/1995 | Sawyer | B01F 11/0028 |
| | | | 366/110 |
| 5,558,839 A | 9/1996 | Matte et al. | |
| 5,885,530 A * | 3/1999 | Babson | B01L 3/50853 |
| | | | 422/63 |
| 5,947,594 A | 9/1999 | Dolatli et al. | |
| 8,152,603 B2 | 4/2012 | Hart et al. | |
| 8,899,821 B2 | 12/2014 | Herz et al. | |
| 2013/0315802 A1 | 11/2013 | Manian et al. | |

FOREIGN PATENT DOCUMENTS

| | | |
|---|---|---|
| CN | 204017875 U | 12/2014 |
| CN | 204051561 U | 12/2014 |

OTHER PUBLICATIONS

Holly Ganz, "How to Use an Oscillatory Tool as a Bead Beater for DNA Extractions", YouTube Video, Oct. 24, 2014, https://www.youtube.com/watch?v=Q7PM1xoMjiU.

* cited by examiner

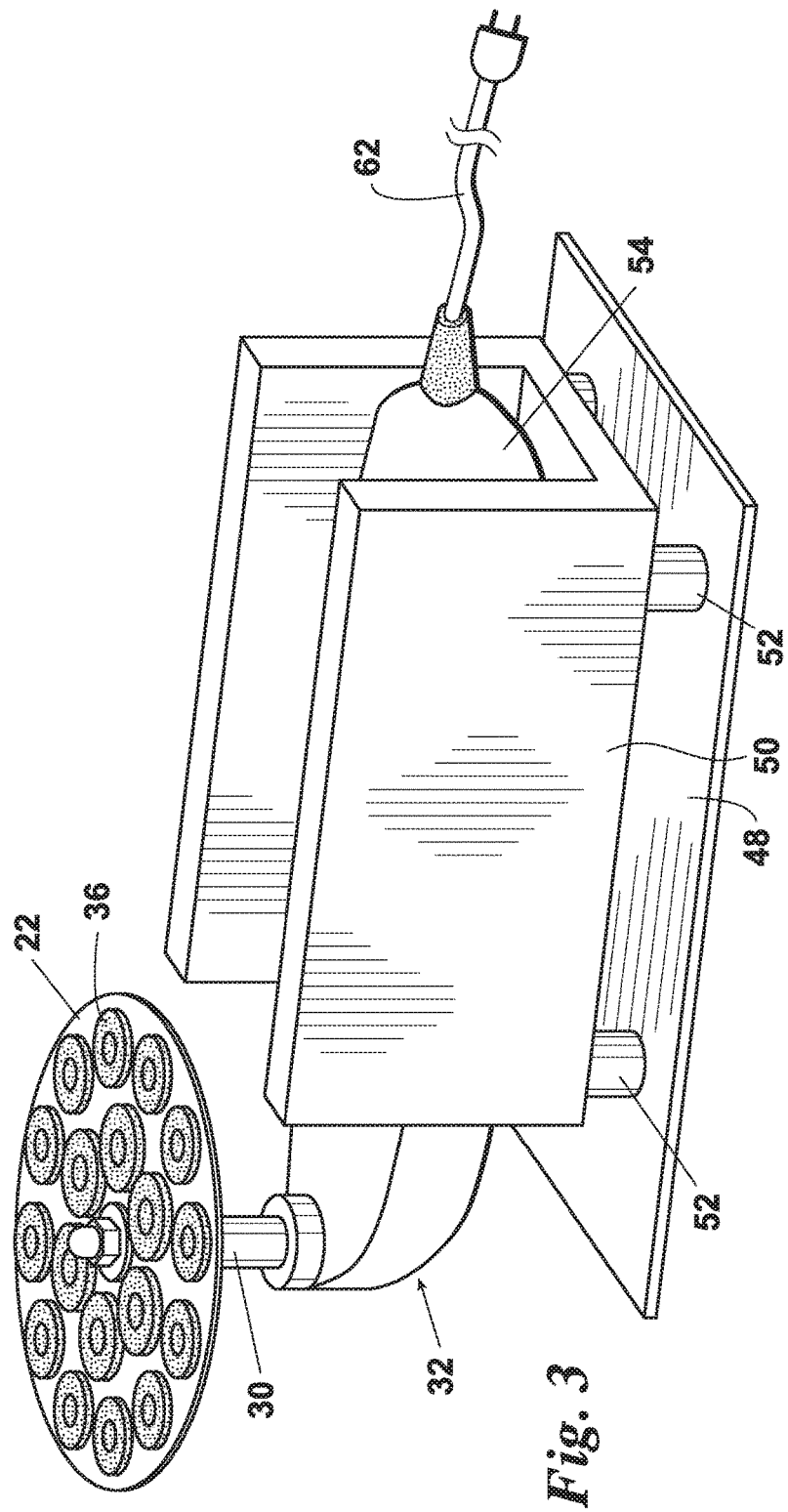
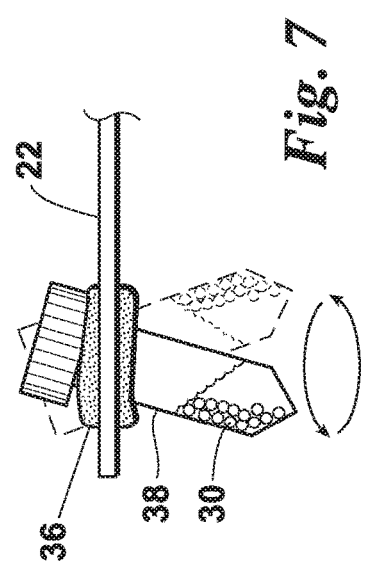

APPARATUS AND METHOD FOR VORTEX MIXING AND CELL DISRUPTION OF A LABORATORY SAMPLE

1. CROSS-REFERENCE TO RELATED APPLICATIONS

The present application claims priority to U.S. Provisional Patent Application No. 62/190,003 filed on Jul. 8, 2015, which is incorporated herein by reference.

2. FIELD OF THE INVENTION

The present invention relates generally to an apparatus and method for mixing scientific samples. More particularly, the present invention relates to an apparatus and method for mixing sample vials using an oscillating multi-function tool.

3. BACKGROUND OF THE INVENTION

Mechanical Devices that mix the contents of small vessels (e.g. vials, test tubes) have been available for the laboratory for over 100 years. They cause the contents of a vial (hence called sample) to move and, if the sample is a liquid or solid particles suspended in liquid of two or more components, to become homogeneous in composition.

Mechanical mixing is achieved by swirling the sample (called vortexing), inverting the sample, or shaking the sample. Examples of commercial mechanical devices on the market designed to achieve this goal include VORTEX-GENIE, MIX-ALL ROTATORS, and rocking shakers. This invention addresses an improved way to mix one or more samples within small vessels sealed with a lid or cap. Because the vessel is sealed, it is not possible to cause mixing of the contents with an external rod, spoon, propeller or recycling pump.

All commercially available devices mix sealed vials or tubes at mixing rates from 3 to 3000 revolutions per minute. The present invention teaches how shaking speeds of 5,000-30,000 rpm can be used to greatly improve the energy of mixing in small, sealed vessels. Mixing times are 5 to 50 times faster than the current state of the art.

BRIEF SUMMARY OF THE INVENTION

The present invention achieves its objectives by providing an economical and reliable way to mix homogenous samples in small sample vials. It is a method and apparatus to mix sealed sample vials using an oscillating multi-function tool commonly referred to as a multi tool. The vial sizes can vary but are typically 0.2, 0.5 and 2.0 ml.

In its simplest form, the present invention has a plate with a center point and plurality of apertures passing through the plate. Each aperture has a grommet lining the circumference of the aperture. The apertures and grommets are sized to receive various standard sized vials. One of the more popular sizes is 2.0 ml although other sizes can be used. Another aperture is located at the center point of the plate. This aperture is sized to receive an arbor of an oscillating multi tool.

The present invention may further include a stand which holds the multi tool on a horizontal plane with the arbor or attachment point of the multi tool in the vertical direction. The stand has a weighted base with one or more mounting brackets extending upward. The brackets each have a dampening means to attenuate the vibration from the multi tool.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 3 is a sectional view of part of the internal portion of the preferred embodiment of the present invention;

FIG. 6 is a side view of a specimen loaded in a plate with the variable speed multi-tool in the off position;

FIG. 7 is a side view of a specimen loaded in a plate with the variable speed multi-tool in the on position.

DETAILED DESCRIPTION OF THE PREFERRED EMBODIMENT(S)

Figure 1:
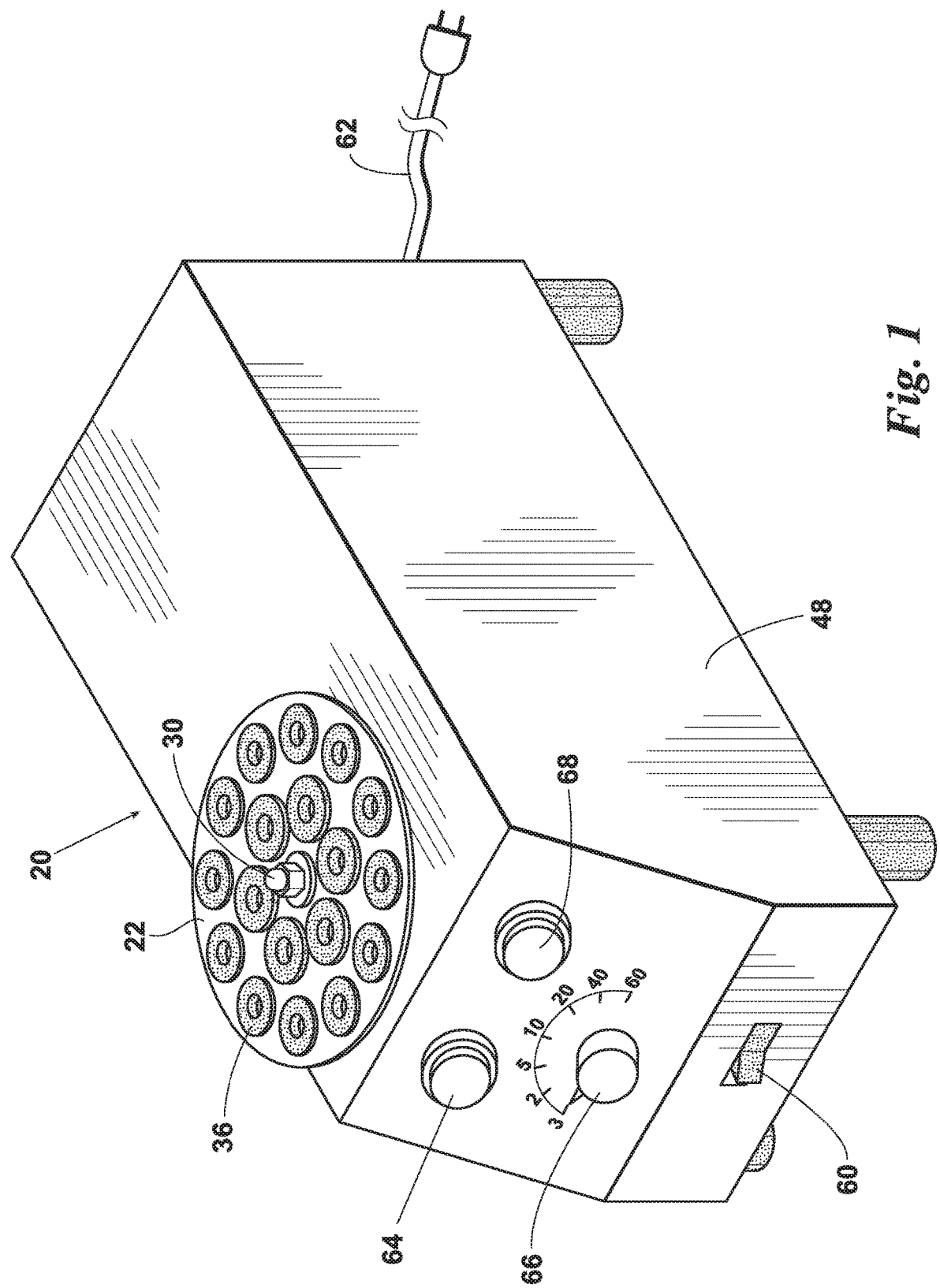
FIG. 1 is a perspective view of the preferred embodiment of the present invention.
Figure 2A:
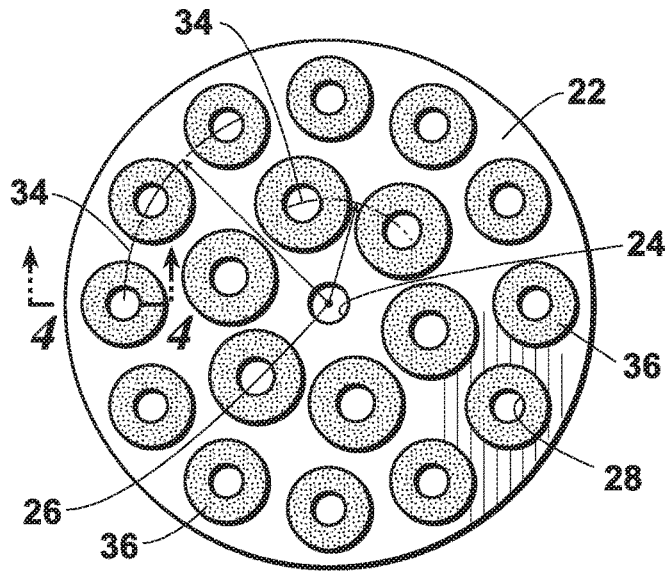
FIG. 2a is a top view of the plate of the present invention.

Turning now to the drawings wherein like reference characters indicate like or similar parts throughout, FIGS. 1, 2a and 3 which illustrates the preferred embodiment of the vortexing and cell disruption machine 20. It has a plate 22 with a mounting aperture 24 at the center 26 and a plurality of sample apertures 28 passing through it. The mounting aperture 24 is sized to receive an arbor 30 of an oscillating multi-function tool 32. Oscillating multi-function tools 32 are well known in the field and are available from several manufactures. They are typically used as a hand-held construction tool and have a blade attachment to cut wood, metal, plastic and other substrate in confined spaces.

Figure 2B:
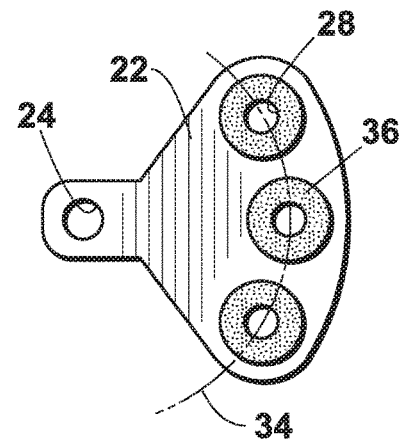
FIG. 2b is a top view of a second embodiment of the plate of the present invention.
Figure 4:
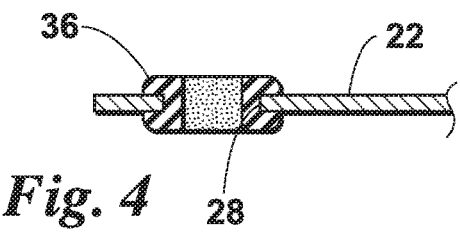
FIG. 4 is a cross section of the resilient grommet lined apertures of the plate.

The plate 22 may be constructed out of sheet metal such as stainless steel, aluminum, plain carbon steel or a corrosion resistant alloy. The exact size and shape of the plate 22 may vary. However, the Applicant has found a generally circular shape of less than 5 inches in diameter to be most effective. The preferred embodiment of the plate 22 has a diameter of 4.5 inches. The sample apertures 28 are located on one or more arcs 34. The first arc 34 is located on a radius of 2 inches from the center 26 of the plate 22. If there is a second arc 34 of sample apertures 28 it may be located within the first arc 34. In the preferred embodiment the second arc 34 has a radius of 1 inch. As can be seen in FIGS. 1, 2a and 3 in the preferred embodiment the arc 34 is a complete circle, But it can also be a partial segment of a circle (pie-cut shape) having fewer sample apertures than a full circular shape without compromising the performance of the vortex mixer. See FIG. 2b Each sample aperture 28 is lined with a grommet 36. The grommets 36 are preferably made of silicon rubber or another resilient material and are sized to receive sample vial 38. FIG. 4 provides a cross section of a sample aperture 28 and grommet 36. In the preferred embodiment, the sample apertures 28 with their grommet 36 hold the sample vials 38 loosely with a clearance on all sides of the vial 38 of 0.0 to 0.05 inches.

There must also be a slight clearance between the sample aperture 28 in the plate 22 and the outside diameter of the grommet 36. The outside diameter is referring to the portion of the grommet 36 which passes through the sample aperture 28 as opposed to the lips of the grommet 36 which extend over the opposing surfaces of the plate 22. This clearance allows a slight movement between the grommet 36 and plate 22 which amplifies the vortexing motion of the vial 38. If there is not a clearance between these two surfaces, the vortexing motion of the vial is greatly diminished. These clearances allow the bottom of the vials 38, filled with sample and, in some cases, also grinding media, below the plate 22 to rotate in a circular or vortexing motion when the oscillating multi-function tool 32 is on. It is preferred to have a securable lid on the vial 38. It is also preferred to have the level of the sample in the vial 38 below the plate 22 when the vial 28 is inserted in the plate 22. See FIGS. 6 and 7.

While the details may vary, the preferred embodiment of the clearance between the apertures and the grommet are as follows:

| SAMPLE SIZE | SAMPLE APERTURE DIAMETER | GROMMET OUTSIDE DIAMETER |
| --- | --- | --- |
| 0.2 ml | 7/16" | 1/4" |
| 0.5 ml | 9/16" | 5/16" |
| 2.0 ml | 11/16" | 7/16" |

One consequence of the clearance between the grommet 36 and the sample aperture 28 is the creation of heat from friction. This heat can melt the outside diameter of the grommet 36 and eventually cause it to fail. For this reason the preferred embodiment uses grommets 36 made of silicon rubber or a similar heat resistant resilient material. This heat resistant material is capable of operating without deteriorating from the heat.

Figure 5A:
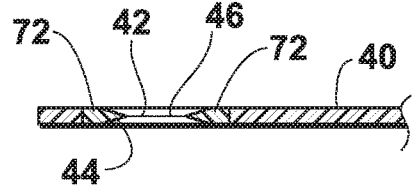
FIG. 5a is a cross section of the apertures of a polymer plate with beveled edges.
Figure 8:
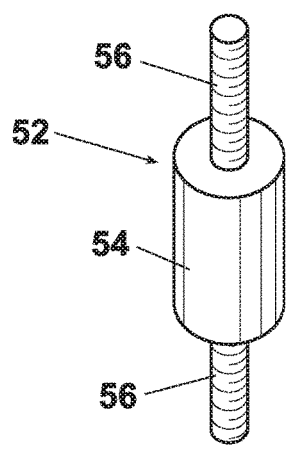
FIG. 8 is a perspective view of an vibration isolating mount.

An alternate embodiment of the metal plate 22 shown in FIGS. 1-4, 6 and 7 is the polymer plate molded with two different polymers 40 shown in FIG. 5a. The size of the polymer plate 40 and layout of the sample apertures 28 remain the same as with the metal plate 22. The majority of the plate 40 is made with a stiff, hard, plastic such as, polycarbonate and the circumference 72 of each sample aperture 28 is made with a flexible rubber. The polymer plate 40 the interior flexible edge 42 of the sample apertures 28 have a taper 44. Thus, the vial 38 is held along a line 46 of this interior edge 42 with a clearance of 0.0 to 0.05 inches between the interior edge 42 and the vial 38. In this embodiment the grommet is provided by the interior flexible edge 42.

Figure 5B:
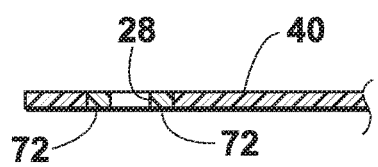
FIG. 5b is a cross section of the apertures of a two part polymer plate.

FIG. 5b provides a cross section of yet another embodiment where the plate 40 is molded from two types of plastic. The majority of the plate 40 is a rigid plastic such as polycarbonate with the circumference 72 of the sample apertures 28 are made of a flexible rubber or plastic. This provides the benefits of the grommet 36 shown in FIGS. 1-4 with the benefits of a single piece construction, namely easy cleanup.

Figure 5C:
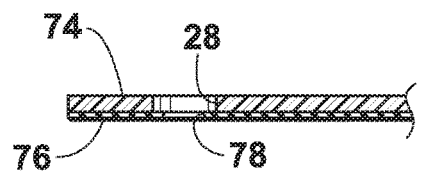
FIG. 5c is a cross section of the apertures of a plate with a sheet of resilient material.

FIG. 5c provides a cross section of yet another embodiment of the plate 74. Here the grommet is a sheet of rubber 76 or other flexible material that is secured to one side of the plate 74. The plate 74 in this embodiment may be made of any stiff or rigid material such as metal or polycarbonate.

The sheet of rubber 76 has a plurality of apertures 78 which are slightly smaller than the sample apertures 28. The apertures 78 in the sheet of rubber 76 are aligned with the sample apertures 28 in the plate 76.

Either version of the plate 22 and 40 can be used with an oscillating multi-function tool 32 while holding the tool 32. However, in the preferred embodiment, the plate 22 or 40 is used in conjunction with vortexing and cell disruption machine 20. FIG. 1 provides a perspective view of the vortexing and cell disruption machine 20. FIG. 3 shows a sectional view of part of the machine 20. The machine 20 has a housing 48 which encloses the machine 20. An oscillating multi-function tool 32 is mounted within the housing 48 in a manner that isolates the housing 48 from the vibration of the tool 32. The arbor 30 of the tool 32 extends outside of the housing and has a plate 22 or 40 attached to it.

In the preferred embodiment shown in FIG. 3, the tool 32 is secured to a weighted base 50. The weighted base 50 is secured to the housing 48 by one or more isolating mounts 52. The mounts 52 used in the preferred embodiment have a body 54 made from rubber or another resilient material. There are a pair of elongated threaded members 56 extending from opposing sides of the body 54. One threaded member 56 is secured to the weighted base 50 the other threaded member 56 is secured to the housing 48.

The machine 20 may include controls 58. In the preferred embodiment there is an on/off switch 60 which can isolate the controls 58 and the tool 32 from the power source 62. So in order to operate the machine 20 the on/off switch 60 must be in the on position. Once on, the machine can be operated in a pulse mode or a timed mode. To operate the machine in the pulse mode, the pulse button 64 is depressed. This provides power to the tool 32 for as long as the pulse button 64 is depressed.

To operate the machine 20 in timed mode the timer 66 is set to the desired length of time for the machine 20 to operate. The start button 68 is then depressed to begin the timed period of operation. At the end of the desired length of time the machine 20 automatically stops the operation of the machine 20.

In the preferred embodiment of the method, the sample vial 38 is partially filled with the sample. Mixing beads 70 may be included in the sample to aid in mixing or to disrupt tissue cells by their grinding action. The sample vial 38 is then closed and inserted into one of the sample apertures 28 such that the level of the sample is below the plate 22 or 40. The oscillating multi-function tool 32 is then turned on. This can be accomplished through direct operation of the tool 32 if holding the tool 32. Or if the tool 32 is mounted in the vortexing and cell disruption machine 20 it can be accomplished in either the pulse or timed mode. The vibration of the tool 32 causes a vortex mixing action in the vial 38 as seen in FIG. 7. The operation of the tool is continued until the desired sample consistency is obtained. The tool 32 is then turned off and the sample vial or vials 38 are removed from the sample aperture(s) 28 and are additionally processed. Such additional processing depends upon the testing being done. Turning off of the tool 32 may be accomplished by direct operation of the tool 32 if handheld, or release of the pulse button 64 or completion of the desired time period if operated in the timer mode.

The oscillation speed is generally between 5,000 and 30,000 RPMs. In the preferred embodiment the oscillation is approximately 21,000 RPMs.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An apparatus for vortexing and cell disruption of a laboratory sample, the apparatus comprising:
    a plate having a center point and a plurality of apertures passing through the plate;
    the apertures located along an arc;
    each of the apertures having a flexible grommet lining the circumference of the aperture;
    each aperture and its grommet being sized to receive a sample vial; and
    an operable oscillating multi-function tool for inducing a vortexing motion in the sample vial.

2. The apparatus of claim 1 further comprising:
    the arc of the apertures having a radius of less than 3 inches from the center point of the plate.

3. The apparatus of claim 2 further comprising:
    the arc of the apertures forming a circle.

4. The apparatus of claim 1, further comprising:
    the grommets made from silicon rubber and having a clearance of 3/16" to 1/4" between the diameter of the aperture and the outside diameter of the grommet.

5. The apparatus of claim 1, the grommets comprising:
    a sheet of flexible material having a plurality of apertures and secured to a single side of the plate;
    wherein the apertures of the flexible material are slightly smaller than the sample apertures and aligned with the sample apertures.

6. The apparatus of claim 1 further comprising:
    the oscillating multi-function tool having an arbor extending from a body;
    a base sized to hold the body of the oscillating multi-function tool;
    wherein the plate is mounted to the arbor of the oscillating multi-function tool.

7. The apparatus of claim 6 further comprising:
    a housing enclosing the body of the oscillating multi-function tool and weighted base;
    the plate being located outside of the body; and
    an elastomeric resilient material located between the oscillating multi-function tool and the housing;
    wherein the elastomeric resilient material isolates the base from vibration from the oscillating multi-function tool.

8. The apparatus of claim 6 further comprising:
    a timer in line with a power source supply;
    wherein the timer is capable of providing power to the oscillating multi-function tool for a given time and then terminating the power.

9. The apparatus of claim 1 further comprising:
    the plate being circular in shape.

10. The apparatus of claim 1 further comprising:
    the plate being a partial segment of a circle in shape.

11. The apparatus of claim 1 further comprising:
    a sample vial located in one of the apertures.

12. An apparatus for vortexing and cell disruption of a laboratory sample, the apparatus comprising:
    a circular polymer plate having a center point and a plurality of sample apertures passing through the plate;
    a mounting aperture located at the center point;
    the sample apertures located along an arc;
    each of the sample apertures having a chamfered edge;
    each sample aperture being sized to receive a sample vial; and
    a mounting aperture located at the center point of the plate sized to receive a post of an operable oscillating multi-function tool for inducing a vortexing motion in the sample vial.

13. The apparatus of claim 12 further comprising:
    the arc of the sample apertures having a radius of less than 3 inches from the center point of the plate.

14. The apparatus of claim 13 further comprising:
    the arc of the sample apertures forming a circle.

15. The apparatus of claim 12:
    an oscillating multi-function tool having an arbor extending from a body;
    a base sized to hold the body of the oscillating multi-function tool;
    wherein the plate is mounted to the arbor of the oscillating multi-function tool.

16. The apparatus of claim 15 further comprising:
    a housing enclosing the body of the oscillating multi-function tool and weighted base;
    the plate being located outside of the body; and
    an elastomeric resilient material located between the oscillating multi-function tool and the housing;
    wherein the elastomeric resilient material isolates the base from vibration from the oscillating multi-function tool.

17. The apparatus of claim 16 further comprising:
    a timer in line with a power source supply;
    wherein the timer is capable of providing power to the oscillating multi-function tool for a given time and then terminating the power.

18. The apparatus of claim 12 further comprising:
    each sample aperture a circumference surrounded by a flexible plastic.

* * * * *